July 2, 1963
W. S. PARKER
3,096,127
RIDING RING FOR ROTARY CYLINDERS
Filed April 20, 1961
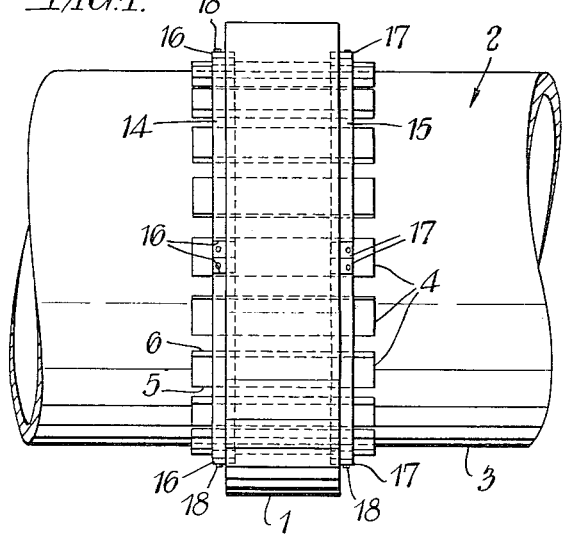
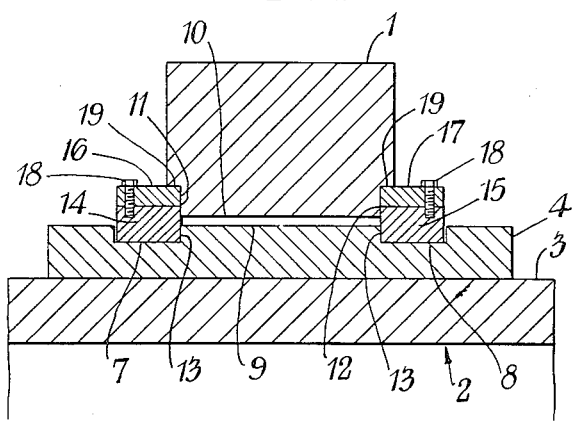
Inventor
William Syme Parker
By
Tennis Edmonds, Morton Barrows & Taylor
Attorneys _United States Patent Office_ 3,096,127
Patented July 2, 1963

3,096,127
RIDING RING FOR ROTARY CYLINDERS
William Sym Parker, Barrow-in-Furness, England, assignor to Vickers-Armstrongs (Engineers) Limited, London, England, a British company
Filed Apr. 20, 1961, Ser. No. 104,384
Claims priority, application Great Britain May 31, 1960
7 Claims. (Cl. 308—36)

This invention relates to devices for locating tires or riding rings on rotatable cylindrical members.

According to the present invention there is provided a device for locating a loose tire or riding ring on a rotatable cylindrical member, wherein the tire or riding ring has an annular recess at each extreme end of the bore thereof, there being split retaining rings spaced axially along the cylindrical member and entered in grooves associated with the outer surface of the cylindrical member, said retaining rings projecting radially from their associated grooves and partly filling said annular recesses, the retaining rings co-operating one with each of the shoulders formed between each recess and the main part of said bore thereby to locate the tire or riding ring axially of the cylindrical member.

For a better understanding of the invention and to show how the same may be carried into effect, reference will now be made, by way of example, to the accompanying drawing in which:

FIGURE 1 is an elevational view of a rotatable drum having a tire or riding ring thereon, and FIGURE 2 is a vertical sectional view of part of the drum of FIGURE 1, the section being taken through the axis of the drum.

Referring now to the drawing, there is shown an annular riding ring or tire 1 which loosely surrounds a rotatable drum 2 forming part of a rotary kiln, cooler, dryer or like device.

The cylindrical exterior 3 of the drum 2 carries a plurality of rectangular pads 4 which are identical to one another and spaced at equal intervals circumferentially around the exterior 3 of the drum 2. Each pad 4 is located such that its two longer edges 5 and 6 extend parallel to the longitudinal axis of the drum 2 and such that the centers of the pads 4 are all located in a common plane which extends at right angles to the longitudinal axis of the drum 2. Each pad 4 has two grooves 7 and 8 (see FIGURE 2) in the outer surface 9 thereof, the grooves 7 and 8 both extending at right angles to the drum axis. The grooves 7 and 8 form first and second sets of grooves, the groove 7 in each pad 4 being a member of the first set and the groove 8 of each pad 4 being a member of the second set. The first and second sets of grooves 7 and 8 each lie in a plane perpendicular to the longitudinal axis of the drum 2.

The annular tire or riding ring 1 is of the configuration formed by rotating a basically rectangular area about an axis. The basic form of the rectangle is, however, modified so that the bore 10 of the tire 1 has annular recesses at the extreme end portions thereof. Annular shoulders 11 and 12 are formed between the respective recesses in the bore 10 and the main portion of the bore 10 of the tire 1. The radial distance from the axis of the tire 1 to the inner surface of the main portion of the bore 10 is very slightly greater than the radial distance from the axis of the drum 2 to the outer surfaces 9 of the pads 4. Thus the tire 1 can be passed around the drum 2 to encircle the drum 2 and pads 4. The distance between the shoulders 11 and 12 is equal to the distance between the innermost edges 13 of the grooves 7 and 8 in each pad 4 and the tire 1 is positioned with the shoulders 11 and 12 aligned with the edges 13.

When the tire is so positioned retaining rings 14 and 15 are disposed one in each of the sets of grooves 7 and 8, each ring 14 and 15 partly filling the adjacent annular recess of the tire 1. Each of the retaining rings 14 and 15 is in halves and these ring halves are sprung into position to bottom in the associated set of grooves 7 or 8. Keep plates 16 and 17 are then secured by screws 18 to the outer circumferential surface of each ring 14 and 15, each keep plate 16 or 17 being entered in the adjacent recess of the ring 1 to be in sliding contact with the cylindrical surface 19 of the recess and the adjacent shoulder 11 or 12.

Those parts of the rings 14 and 15 which project above the outer surfaces 9 of the pads 4 cooperate with the shoulders 11 and 12 and serve to locate the riding ring or tire 1 axially of the drum 2. The keep plates 16 and 17 maintain the rings 14 and 15 in the grooves 7 and 8. Preferably there are three keep plates 16 or 17 on each half of each of the rings 14 and 15. In this arrangement one keep plate 16 or 17 is adjacent each end of each ring half and a further keep plate 16 or 17 is arranged mid-way between the ends of each ring half.

I claim:

1. In a combination including a rotatable cylindrical member, and a loosely fitting riding ring encircling the cylindrical member, the improvement in which said rotatable cylindrical member has a pair of spaced circumferentially-extending grooves associated with its outer surface respectively located at the ends of the riding ring and in which said riding ring includes an annular recess at each extreme end of its bore, each recess presenting a radially-extending annular shoulder and a cylindrical surface extending from the shoulder to the adjacent end of the ring, and a retaining ring at each end of the riding ring located partly in the recess and partly in the groove at said end, each retaining ring consisting of two resilient half-ring segments sprung into position in the groove in which the retaining ring is located, the retaining rings at the respective ends of the riding ring respectively engaging the shoulders thereof to locate the riding ring axially of the cylindrical member.

2. In combination, a rotatable cylindrical member having a pair of spaced circumferentially-extending grooves, a loose riding ring encircling the cylindrical member and located symmetrically with respect to the spaced grooves, said riding ring having an annular recess at each extreme end of the bore thereof each presenting an annular shoulder and a cylindrical surface extending from the shoulder to the adjacent end of the ring, and a retaining ring at each end of the riding ring located partly in the recess thereat and partly in one of the grooves and engaging the bottom of such groove, each retaining ring consisting of two resilient half-ring segments sprung into position in the groove in which the retaining ring is located, the retaining rings at the respective ends of the riding ring respectively engaging the shoulders of the recesses thereof to locate the riding ring axially of the cylindrical member.

3. A combination according to claim 2, characterized by including keep plates secured to the outer circumferential surface of each retaining ring, said keep plates extending into the associated annular recess and having sliding contact with the cylindrical surface thereof.

4. In combination, a rotatable cylindrical member, a plurality of pads fixed to and spaced circumferentially around the outer surface of the cylindrical member, each pad having a pair of spaced circumferentially-extending grooves, the plurality of grooved pads providing a pair of spaced circular rows of grooves extending around the cylindrical member, a loose riding ring encircling the cylindrical member and the pads thereon and located symmetrically with respect to the spaced grooves, said riding ring having an annular recess at each extreme end of the bore thereof, each recess presenting an annular shoulder and a cylindrical surface extending from the shoulder to the adjacent end of the ring, and a split resilient retaining ring at each end of the riding ring located partly in the recess thereat and partly in grooves of one of the rows of grooves in said pads and engaging the bottoms of such grooves, each retaining ring consisting of two half-ring segments sprung into position in the row of grooves in which the retaining ring is located, the retaining rings at the respective ends of the riding ring respectively engaging the shoulders thereof to locate the riding ring axially of the cylindrical member.

5. A combination according to claim 4, characterized by including keep plates secured to the outer circumferential surface of each retaining ring, said keep plates extending into the associated annular recess and having sliding contact with the cylindrical surface thereof.

6. In combination, a rotatable cylindrical member having a pair of spaced circumferentially-extending grooves associated with its outer surface, a loose riding ring encircling the cylindrical member and located symmetrically with respect to the spaced grooves, said riding ring having an annular recess at each extreme end of the bore thereof each presenting an annular shoulder extending from the surface of the bore and a cylindrical surface extending from the shoulder to the adjacent end of the ring, a retaining ring at each end of the riding ring located partly in the recess thereat and partly in the adjacent groove and engaging the bottom of such groove, the retaining rings at the respective ends of the riding ring respectively engaging the shoulders of the recesses thereof to locate the riding ring axially of the cylindrical member, and keep plates secured to the outer circumferential surface of each retaining ring, said keep plates extending respectively into the adjacent annular recesses and having sliding contact with the respective cylindrical surfaces thereof.

7. In combination, a rotatable cylindrical member, a plurality of pads fixed to and spaced circumferentially around the outer surface of the cylindrical member, each pad having a pair of spaced circumferentially-extending grooves, the plurality of grooved pads providing a pair of spaced circular rows of grooves extending around the cylindrical member, a loose riding ring encircling the cylindrical member and the pads thereon and located symmetrically with respect to the spaced rows of grooves, said riding ring having an annular recess at each extreme end of the bore thereof, each recess presenting an annular shoulder extending from the surface of the bore and a cylindrical surface extending from the shoulder to the adjacent end of the ring, a split resilient retaining ring at each end of the riding ring located partly in the recess thereat and partly in grooves of the adjacent row of grooves in said pads and engaging the bottoms of such grooves, the retaining rings at the respective ends of the riding ring respectively engaging the shoulders thereof to locate the riding ring axially of the cylindrical member, and keep plates secured to the outer circumferential surface of each retaining ring, said keep plates extending respectively into the adjacent annular recesses and having sliding contact with the respective cylindrical surfaces thereof.

References Cited in the file of this patent
UNITED STATES PATENTS

| | | |
|---|---|---|
| 2,278,625 | Traylor et al. | Apr. 7, 1942 |
| 2,543,595 | Patten | Feb. 27, 1951 |
| 2,678,856 | Chievitz | May 18, 1954 |
| 3,034,811 | Stevenson et al | May 15, 1962 |